June 3, 1958 — E. P. G. WRIGHT ET AL — 2,837,281
TOTALISATOR EQUIPMENT
Filed May 13, 1952 — 5 Sheets-Sheet 1
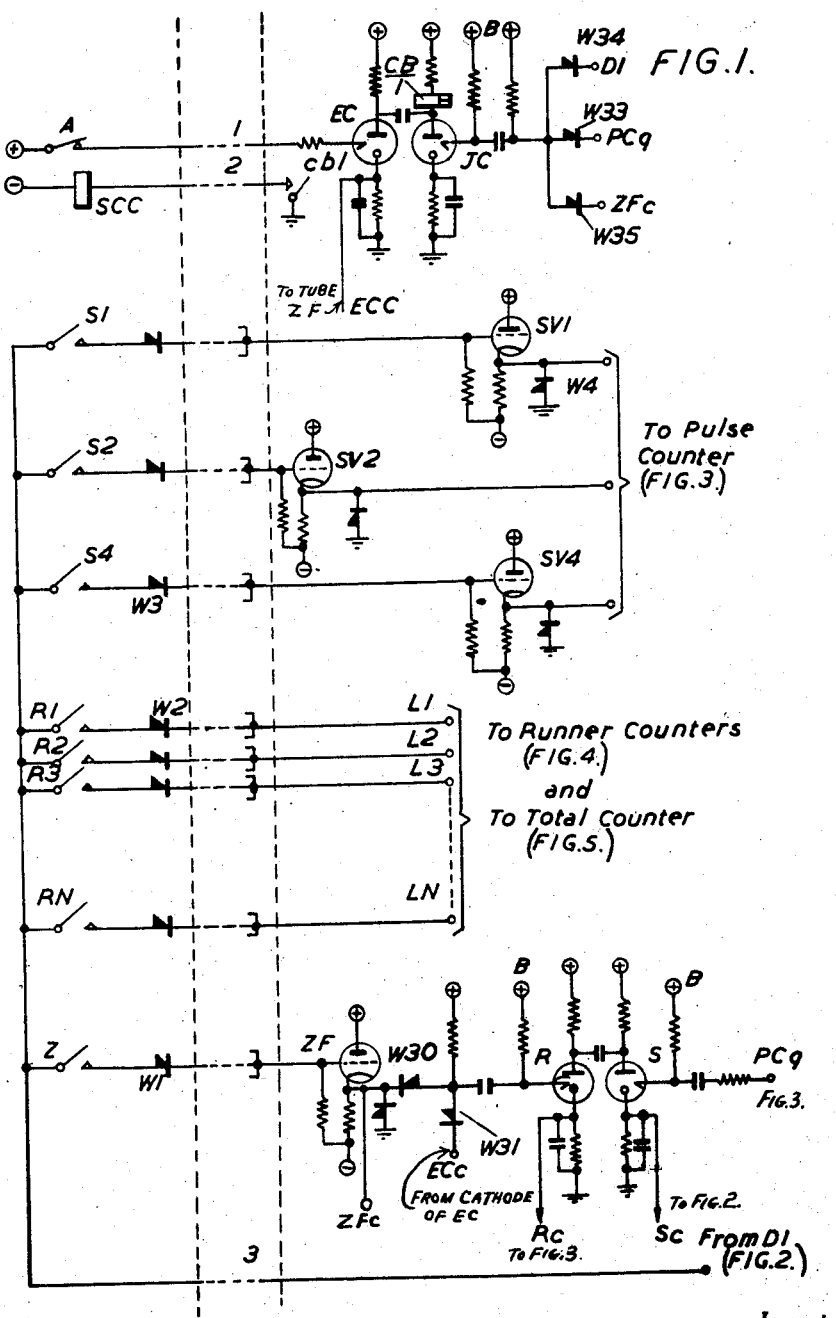
Inventor
E. P.G.WRIGHT
D.A.WEIR - G.R.PHILLIPS
By
Attorney

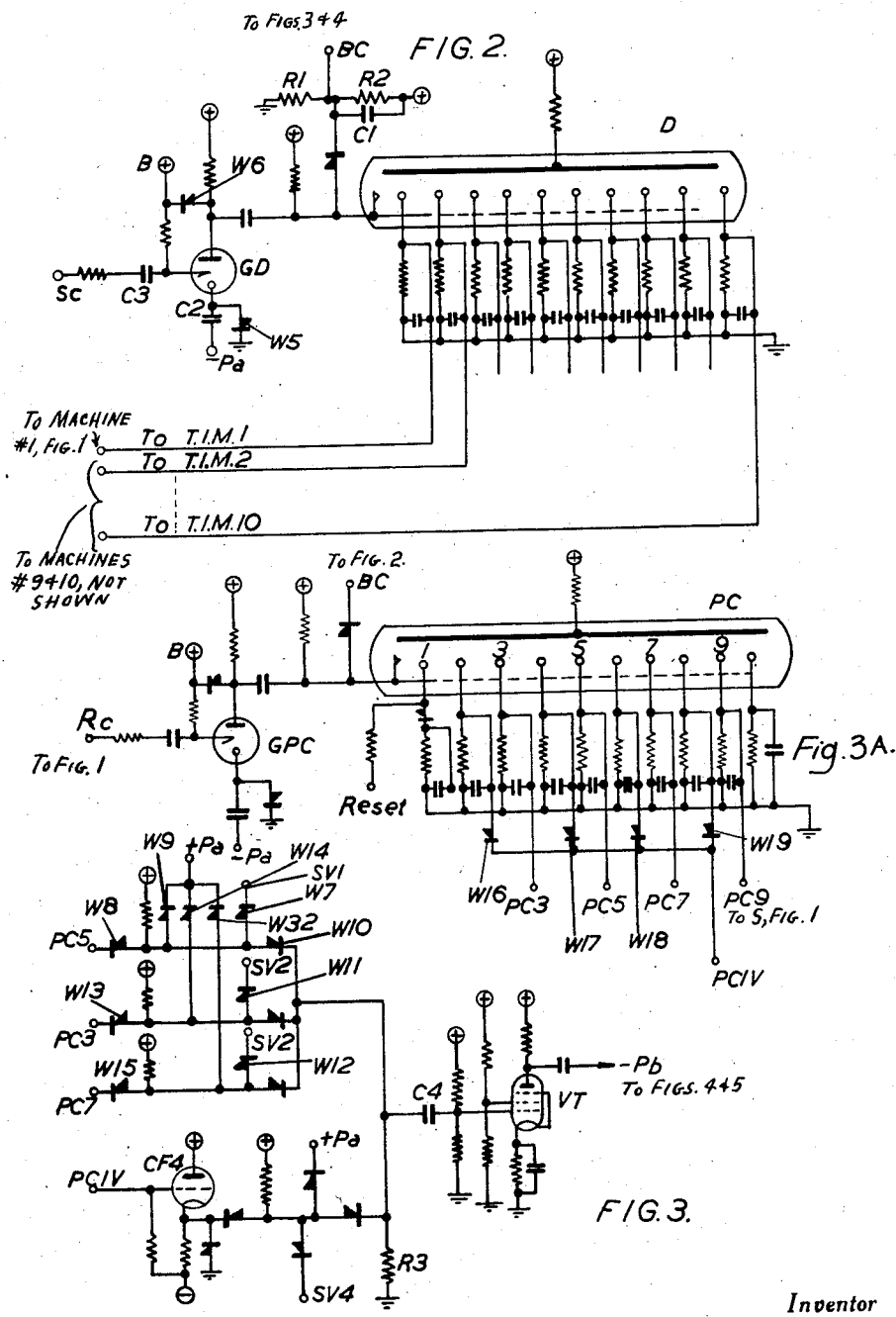

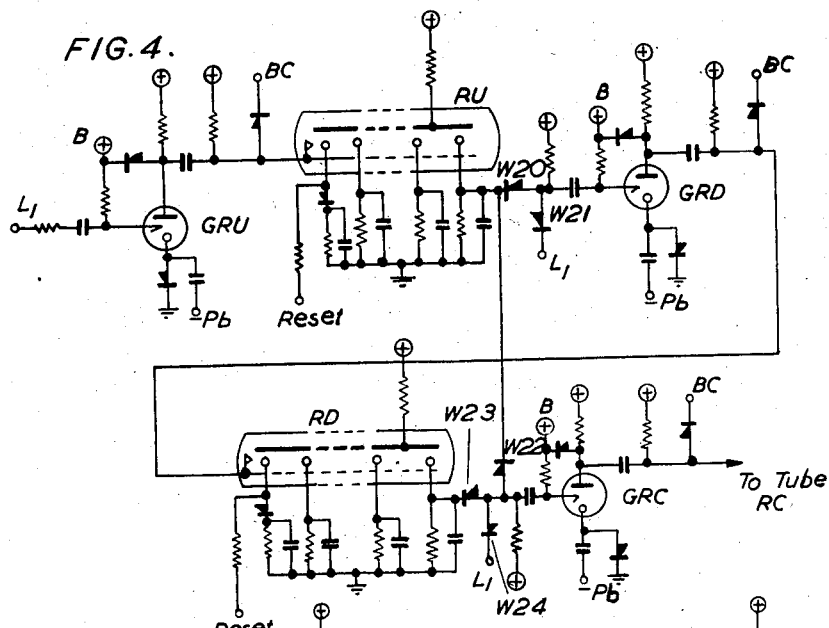
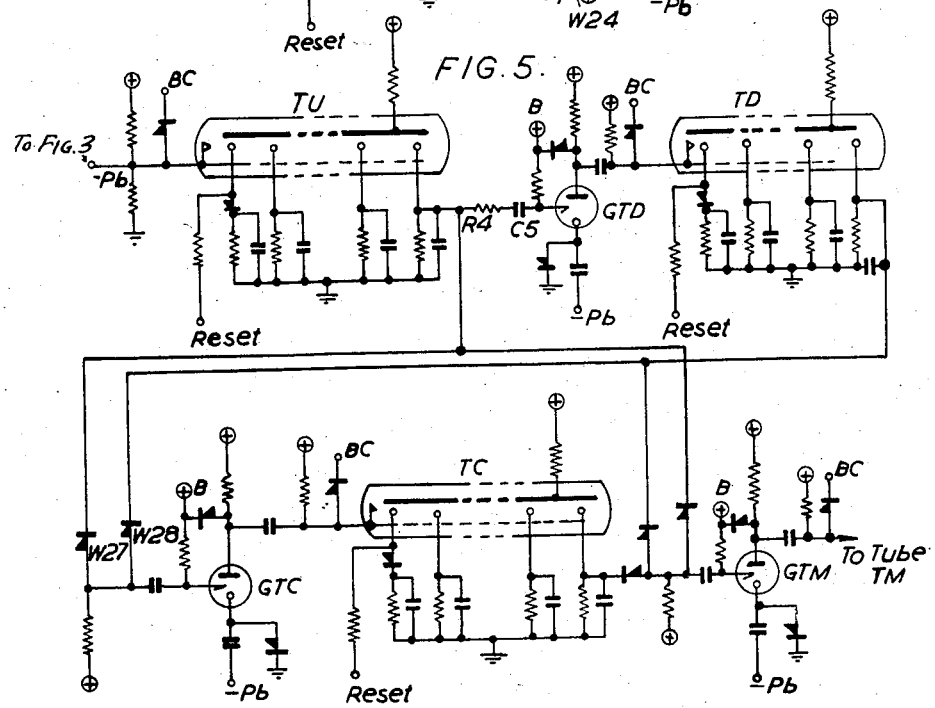

June 3, 1958 E. P. G. WRIGHT ET AL 2,837,281
TOTALISATOR EQUIPMENT
Filed May 13, 1952 5 Sheets-Sheet 4
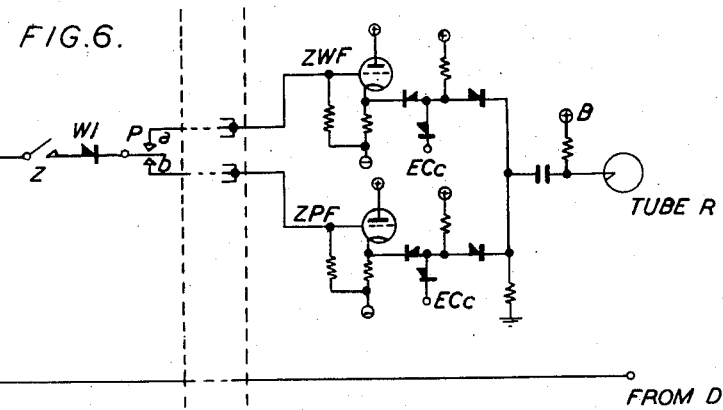
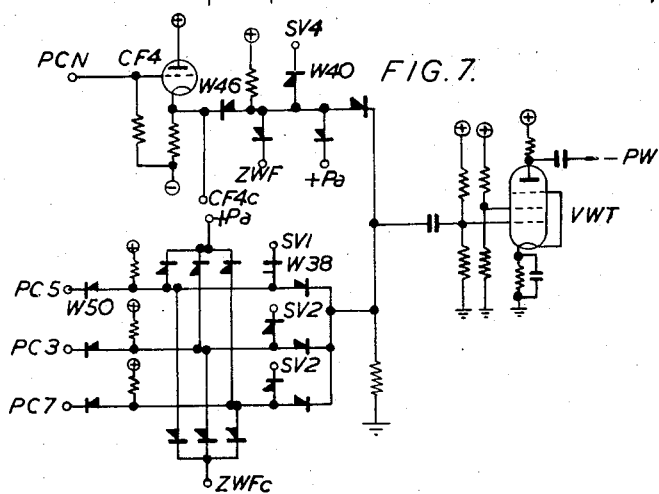
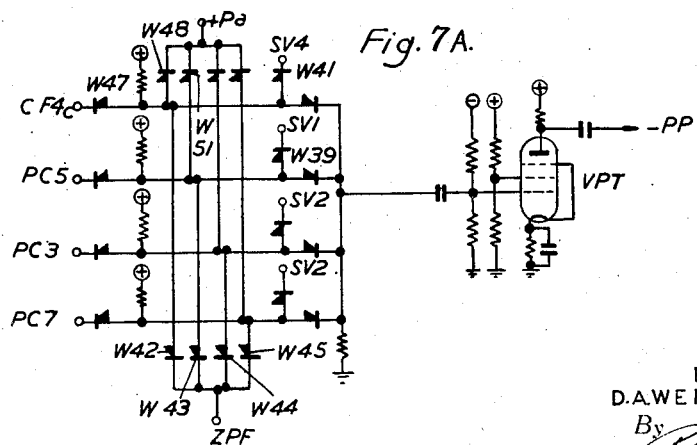
Inventor
E. P. G. WRIGHT
D. A. WEIR - G. R. PHILLIPS
Attorney June 3, 1958  E. P. G. WRIGHT ET AL  2,837,281
TOTALISATOR EQUIPMENT
Filed May 13, 1952  5 Sheets-Sheet 5
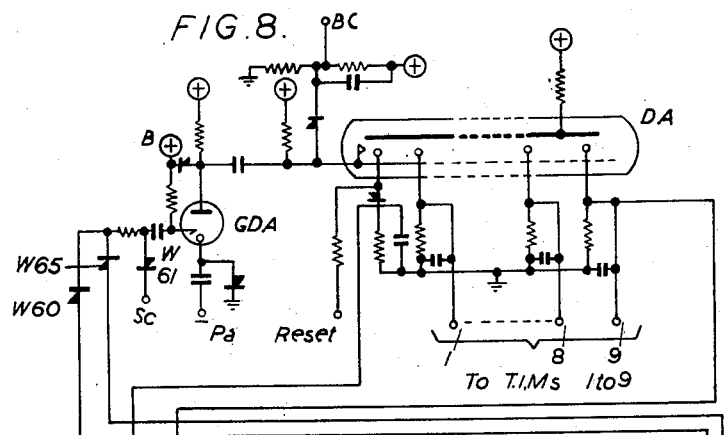
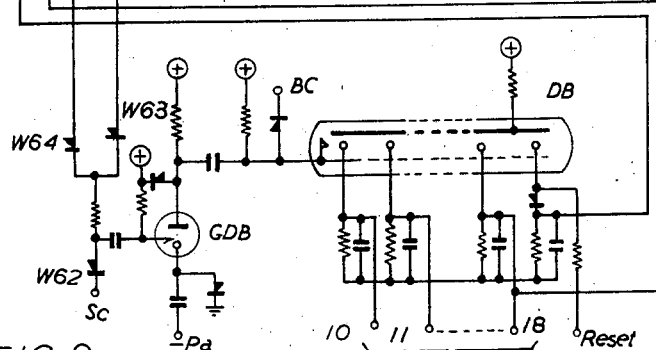
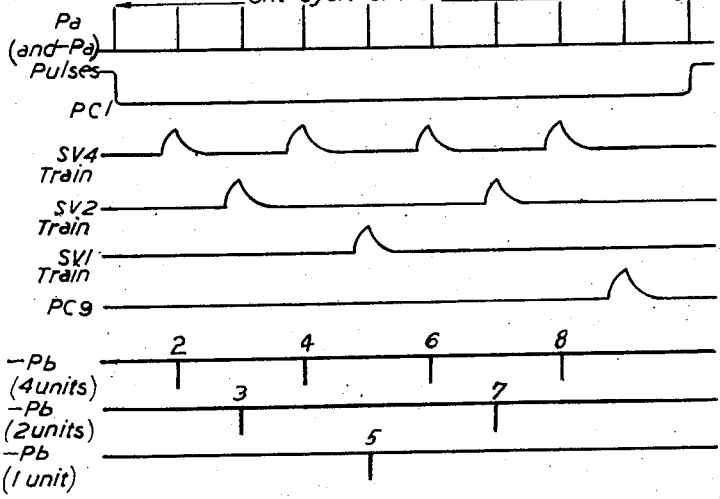
Inventor
E. P. G. WRIGHT-
D. A. WEIR-G. R. PHILLIPS
By
Attorney

United States Patent Office 2,837,281
Patented June 3, 1958

2,837,281
TOTALISATOR EQUIPMENT

Esmond Philip Goodwin Wright, Donald Adams Weir and Glyndwr Rhys Phillips, London, England, assignors to International Standard Electric Corporation, New York, N. Y.

Application May 13, 1952, Serial No. 287,556

Claims priority, application Great Britain May 17, 1951

10 Claims. (Cl. 235—92)

The present invention relates to electrical totalisators.

In totalisators it is highly desirable that the counting or aggregating equipment and the distribution arrangements whereby the ticket issuing machines and the counting equipment are interconnected have high speeds of operation. It is an object of the present invention to provide a totalisator in which such high speed operation is obtained.

One feature of the present invention comprises a totalisator comprising a central source of electrical pulses, a distributor operated from said pulse source and adapted to control the order in which ticket issuing machines pass bets to aggregating equipment, and selecting means for passing selected numbers of pulses to selected aggregators under control of the ticket issuing machines and said pulse source.

A further feature of the present invention comprises a totalisator comprising a central source of electrical pulses, an electronic distributor operated from said pulse source and adapted to control the order in which ticket issuing machines pass bets to electronic aggregating equipment, and electronic selecting means for passing selected numbers of pulses to selected aggregators under control of the ticket issuing machines and said pulse source.

The invention will now be described with reference to the accompanying drawings, in which:

Fig. 1 is a circuit of part of a totalisator according to the present invention;

Fig. 2 is the ticket issuing machine distributor for use in the arrangement of Fig. 1;

Fig. 3 and Fig. 3A are pulse generator circuits whose purpose will be described later;

Fig. 4 is a typical runner counter or aggregator;

Fig. 5 is the grand total counter or aggregator;

Fig. 6 is the modification necessary to the circuit of Fig. 1 to permit betting in either of two pools;

Fig. 7 and Fig. 7A are modifications necessary to the circuit of Fig. 3A for use when betting can occur in either of two pools;

Fig. 8 is a modified ticket issuing machine distributor for serving a maximum of 18 ticket issuing machines;

Fig. 9 shows waveforms explaining the operation of Fig. 3 and Fig. 3A.

In a conventional race totalisator there are a number of ticket issuing machines, each having a number of runner keys, and a number of stake keys. When betting can occur in any one of a number of pools, e. g. win or place, extra pool selecting keys may be provided. Alternately each ticket issuing machine may be restricted to a particular pool. There is also a central control station which has a counter on which all bets on each runner are counted and a grand total counter for counting the total number of bets made. These counters must be duplicated for each pool provided where there are more than one. The central station also has a distributor which successively connects each ticket issuing machine to the counters, a bet being registered if the ticket issuing machine then connected to the counters is ready to send a bet. When the system has a plurality of pools and each ticket issuing machine relates to only one pool, there would be a separate distributor for each pool.

The totalisator according to the present invention falls into this general class of device. It uses a number of electronic circuits which will be briefly described.

A large number of the controlling circuits described use coincidence gate circuits of the type which use dry contact metal rectifiers. In such a gate circuit a common point, which is the output point of the circuit, is connected to a number of control points and to a source of biassing positive potential. The connection to the biassing source includes a resistance while the connections to the control points each include a rectifier.

The potential of a control point can assume either one of two distinct values, one being at or near earth potential and the other being a positive potential. If, as in the arrangements shown, the control point is in the cathode circuit of a vacuum tube or of a cold cathode gaseous discharge gap, the control point potential is at or near earth potential when the tube or gap is non-conducting and is at its positive value when the tube or gap is discharging.

The rectifiers are so oriented as to be in the direction of easy conductivity for current flowing from the biassing source through the rectifiers to the respective control points. The resistance in the connection to the biassing source has a high value compared to the forward direction resistance value of a rectifier, so the effect of the rectifiers is to hold the common point at the potential of the least positive of the control points. This arrangement is such that if nominally equal positive potentials are simultaneously present on all control points of a gate circuit, the potential of the common point of that gate circuit is substantially equal to the nominal control point potential. Thus it will be seen that the common point, i. e. the output point of the gate circuit, only assumes a positive potential when positive potentials are simultaneously present on all the control points. As has been stated, this common point potential is equal to the least positive of the control point potentials.

In the ensuing description, when a control point potential assumes its positive (i. e. its effective) value, the rectifier connected thereto is said to be biassed positive. Only when all rectifiers of a gate circuit, i. e. all rectifiers which are connected to control points of that gate circuit, are biassed positive will the common point potential, and hence the output potential, assume its positive value.

It will be noted also that the connection from the common point of a gate circuit to the next stage of the circuit, i. e. the portion of the circuit controlled by that gate circuit, often includes a further rectifier which is oriented in the direction of easy conductivity for current flowing from that common point to the next stage of the circuit. Such rectifiers are needed to prevent interaction between a number of gates either of which can control the same part of the circuit.

The left-hand half of Fig. 1 shows as much of a single pool ticket issuing machine as is necessary for a proper understanding of the invention. The machine, assumed to be ticket issuing machine No. 1, includes a number of contacts, of which S1, S2 and S4 are stake contacts, R1, R2, R3 . . . RN are contacts of runner keys, a contact A which is normally closed, and a contact Z which is normally open. When a bet is set up, contact A is opened and a runner and stake key operated, after which contact Z is closed. Although A and Z are shown as separate contacts they could be automatically operated.

Of the stake contacts, S1 is for one betting unit, for example two shillings in Great Britain, S2 is for two betting units and S4 is for four betting units. As will be seen, for three unit bets S1 and S2 would be closed, for five unit bets S1 and S4, for six unit bets S2 and S4, and for seven unit bets S1, S2 and S4 would be closed. In these cases there would be a single stake key for such of these multiple value bets as are required, which key would close the appropriate contacts.

Of the runner keys only R1, R2, R3 and RN are shown. Contact Z is closed when A is opened and when a runner key and a stake key have been operated. This could be achieved automatically or manually. Any locking means to prevent simultaneous operation of two runner keys or stake keys would be provided. The Z contact should be preferably be arranged so that it can only close if a runner key and a stake key have been operated.

The stake leads, runner leads and the Z lead extending to the central equipment are common to all ticket issuing machines, while the leads 1, 2 and 3 are individual to the machine shown. The common leads are decoupled by rectifiers such as W1, W2, W3.

Control equipment (Fig. 1)

For each ticket-issuing machine there is a flip-flop EC—JC of which one is shown. This comprises two tubes EC and JC whose anode circuits are interconnected by a condenser. EC is normally discharging due to the positive potential applied thereto via contact A. If the line to the ticket issuing machine is unduly long it would be possible for lead 1, between contact A and the trigger electrode of EC to be a control circuit for a relay whose contact connected a positive potential to the trigger electrode of the tube EC. Hence EC is normally discharging, and as it is discharging its trigger electrode circuit has no control over the current in EC. When a positive potential of a sufficient size is applied to the trigger electrode of tube JC, JC conducts, and the reduction in anode voltage caused thereby charges the coupling condenser in such a way as to reduce the anode voltage of EC. This reduces the anode voltage of EC below the voltage necessary to maintain the discharge, so the discharge in EC is extinguished. When a positive potential is subsequently applied to its trigger electrode, EC refires and extinguishes JC. Relay CB operates when JC fires, and its purpose will be described later.

Each stake lead, when energized causes one of three cathode followers SV1, SV2 and SV4 to conduct. Each of these tubes has its grid and cathode connected to a negative potential via respective resistances, and its cathode connected to earth via a rectifier such as W4. This ensures that the cathode potential of the tube cannot fall below earth. However, the connection to negative potential via a resistance ensures that commencement and cessation of the conduction are rapid.

The commoned Z leads are also connected to a cathode follower ZF, which is of the same type as the stake cathode followers. The output of ZF is connected via a gate circuit to be described fully below to a flip-flop R—S, of which S is normally discharging.

When the distributor energises lead D1 to permit the registration by the control equipment of a bet if ticket issuing machine No. 1 has a bet to send, a positive potential is applied via rectifier W1 to ZF, which conducts and causes R to fire, extinguishing S. It also causes one or more stake tubes to operate, and energises a runner lead. This operation will be more fully described in connection with the description of a bet registration.

Ticket issuing machine distributor (Fig. 2)

In the present description it is assumed that there are not more than 10 ticket issuing machines in the system. The main element of the distributor is a 10 point multi-cathode tube D of the type described in United States Patent No. 2,553,585. Such a tube has a common anode and 10 cathodes arranged in a circle. Between each consecutive pair of cathodes is a transfer electrode. All ten transfer electrodes are connected together. The transfer electrodes are normally biased positive, but less positive than the anode, by the network R1, R2, C1. A negative pulse applied to the commoned transfer electrodes causes the discharge, which is at one of the cathodes to shift to the next cathode in the predetermined direction. Thus it is a scale of 10 counter. There is also a positively-biassed shield electrode adjacent to all cathodes, which is omitted in the circuits in the interests of simplicity.

The pulse supply to D and indeed to all the circuit, comes from a pulse generator producing short pulses at a frequency of 5 kc./s. Negative pulses (—Pa pulses) and positive pulses (+Pa) are produced, each positive pulse being in phase with a negative pulse.

Tube D is controlled by a single tube GD operating as a gate tube. Negative pulses —Pa are permanently applied to the cathode of GD via condenser C2. The cathode of GD cannot go positive with respect to earth due to rectifier W5, and its anode cannot go positive with respect to the bias potential due to W6. The bias potential B is less than the full positive potential. Under these conditions GD can only conduct if a positive potential is applied to its trigger electrode in addition to the bias. This occurs when tube S (Fig. 1) is conducting and charging C3 positive, when gate GD is open. In that case, —Pa pulses cause D to step through its cycle, scanning the ticket issuing machines by successively energising its ten output leads, each of which extends to one of the ticket issuing machines.

When a ticket issuing machine with a bet to send is encountered, S is extinguished and its cathode lead Sc earthed closing the gate GD and stopping D on the cathode connected to the waiting ticket issuing machine.

When the bet is registered, S is refired, energising its lead Sc and restarting the distributor.

If more than 10 ticket issuing machines are used, a number of multi-gap tubes can be connected in series as in Fig. 8 which is described later.

Pulse train generator circuit (Fig. 3 and Fig. 3A)

This circuit generates a train of pulses for each bet, which train of pulses consists of any number of pulses from one to seven, representing one to seven betting units.

The circuit includes a multi-gap tube PC of the same type as D (Fig. 2) and operated in the same manner. Its transfer electrodes are connected to a point BC, this going to a point on a bleeder such as R1—R2 (see Fig. 2). Its gate tube GPC is controlled from tube R, which is normally quiescent. The only differences between the circuit of PC and that of D are that PC has a "reset" connection, and that its cathodes PC2, PC4, PC6 and PC8 are connected to a common point PC1V. When a reset key (not shown) is operated a negative impulse is applied to all reset terminals, and this causes tube PC to discharge at cathode PC1. If already discharging at PC1, this reset condition does not have any effect.

When the distributor finds a ticket issuing machine set up to send details of a bet, tube R is fired (see below), and this opens GPC to —Pa pulses, which are thereupon applied to tube PC. PC therefore steps through its cycle until the discharge reaches the ninth cathode PC9, when S (Fig. 1) is fired, extinguishing R and closing the gate GPC. During this operation, cathodes PC2 to PC8 are fired sequentially and hence each of these cathodes energises its output lead in turn. These leads control a set of gates which will now be described under three headings, viz. S1 closed, S2 closed and S4 closed.

(a) *S1 closed.*—As has been described, when the distributor finds a ticket issuing machine set up with S1 closed, SV1 conducts and delivers an output. This output biasses rectifier W7 positive. When the discharge in PC reaches PC5, W8 is biassed positive thereby, and the next Pa pulse (which steps PC off PC5) biasses W9 positive. Hence a positive pulse is applied via W10 and C4 to the grid of a pentode VT. This tube therefore delivers a negative going output pulse. This is the train of pulses comprising one pulse —P$b$ for a single unit bet.

(b) *S2 closed.*—When the distributor finds a ticket issuing machine set up with S2 closed, SV2 conducts, delivering an output which biasses positive rectifiers W11 and W12. When the discharge in PC reaches PC3, W13 is biassed positive and the next P$a$ positive pulse thereafter biasses W14 to cause a pulse to be applied to the grid of VT. As S1 is assumed to be open, nothing happens on PC5 as W7 is not biassed positive. On PC7 the gate including W15 causes a pulse to be applied to the grid of VT. Hence with S2 closed, two pulses are applied to the grid of VT, thus the —P$b$ pulse train comprises two negative going pulses.

(c) *S4 closed.*—This causes SV4 to deliver an output.

The four cathodes PC2, PC4, PC6 and PC8 are, as has been described above, connected to point PC1V, which is connected to the grid of cathode follower CF4. Rectifiers W16 to W19 are decoupling rectifiers. Each time the discharge in PC rests at one of these four cathodes, CF4 delivers an output to a gate controlled from SV4, so that with S4 closed, four pulses are applied to the grid of VT via the gate controlled by SV4 between the cathode of CF4 and the grid of VT to give a —P$b$ train of four negative going pulses.

With any combination of more than one of S1, S2, S4 closed, a corresponding combination of SV1, SV2, SV4 operate to cause a corresponding pulse train.

Resistance R3 serves to discharge the self capacitances of the gate rectifiers.

Fig. 9 shows the waveforms encountered in the circuit of Fig. 3 and Fig. 3A during the operations described above.

Runner counter (Fig. 4)

Fig. 4 shows a typical runner counter, that for runner number 1. This comprises a number of 10 point multigap tubes RU, RD, . . . etc. of which only two are shown, and which are interconnected by carry-over circuits.

Transfer electrode biasses are obtained from BC, as in the circuit of Fig. 2.

Each 10 point tube, has its own gate tube such as GRU, GRD, GRC, which has negative pulse trains —P$b$ applied to its cathode. Considering first GRU, the gate tube for the units tube RU, it will be seen that this gate is only opened when the runner lead L1 for the appropriate runner is energised. In that case the —P$b$ pulse train is applied to RU to cause it to step.

When RU reaches its ninth cathode, rectifier W20 is biassed positive. On the next —P$b$ pulse produced for that runner, i. e. with lead L1 energised, rectifier W21 is biassed positive from lead L1, and so opens gate GRD to let a pulse enter RD. On the same —P$b$ pulse, RU steps to its zero cathode.

When RD and RU reach their ninth cathodes, W20 and W22 are biassed positive from RU9 and W23 is biassed positive from RD9. The next P$b$ pulse for runner No. 1 biasses W21 positive to cause carry to RD, so that RU returns to zero while a pulse is entered in RD. It also biasses W24 positive, and as W22 and W23 are biassed positive this causes a —P$b$ pulse to be gated through GRC to RC (not shown).

The gate tubes for subsequent desired stages are each controlled in a similar manner from the ninth cathodes of all previous ten point tubes and from the input lead L1. This eliminates the risk of spurious carries occurring.

As the positive potential on each runner lead might thus have to control a large number, maybe 10 or more, gates, it is preferable that the runner leads be applied to runner cathode followers each being of the same type as SV1. These tubes are not shown in Fig. 1 in order to simplify the circuit.

The other runner counters are not shown, but they are identical to that shown in Fig. 4, except that each is controlled from a different runner lead, preferably, as has been indicated above, via a cathode follower.

Total counter (Fig. 5)

This is in all essentials identical to the runner counters except that the control circuits are simplified, since the counter is required to summate all —P$b$ pulse trains. Therefore the —P$b$ pulses are directly applied to the transfer electrodes of the units tube TU.

The higher denomination tubes such as TD and TC are each controlled by gate tubes such as GTD and GTC, which have —P$b$ pulses applied to their cathodes.

When the discharge in TU rests on its ninth cathode the positive potential thereon is applied via resistance R4 and condenser C5 to the trigger of gate tube GTD. The next —P$b$ pulse is gated through GTD to step TD once, and also steps TU back to its zero cathode.

When the discharge in TD rests on its ninth cathode and the discharge in TU also rests on its ninth cathode, W27 and W28 are biased positive. The next —P$b$ pulse is therefore gated through GTD to step TD once, and gated through GTC to step TC once. TU is stepped back to its zero cathode.

As can be seen, the gate tube GTM for the thousands tube TM (not shown) only lets a P$b$ pulse through when TU, TD and TC are all discharging at their ninth cathodes.

As in the case of the runner counters, the gate tubes for subsequent decimal stages are each controlled from the ninth cathodes of all previous tubes. The total counter will need several more decimal stages, since it has to summate all bets for any given race.

It will be noted that all runner counters and the total counter can be reset to zero. This is done before the sale of tickets commences, and occurs on operation of the reset key (not shown).

The cathodes of the total counter are connected to a public indicator, if such a device is required, to control the setting thereof in any known manner.

For a local indication for use by personnel engaged in odds computation, the cathodes of the total counter can be connected each to control a neon tube, so that the neon tubes which are glowing indicate the total. These tubes are not shown, but their method of connection to the cathodes is obvious. To indicate the bets on the winning horse, a further bank of neon tubes is provided, with manually-operable means to connect thereto the tubes of any one runner counter. Alternatively there could be a bank of neon indicator tubes per runner counter. If it is desired to have a public indication of bets on the winner, a public indicator could be provided, which could be connected to and controlled by any one runner.

Registration of a bet

Before the sale of tickets commences for a given race an open sales key (not shown) is operated at the central control position. This key resets all equipment to its zero position, and ensures that tube S of the R—S flip-flop is discharging. It is assumed that all ticket issuing machines are in the correct condition, i. e. with contact A closed, so that the tubes EC of all EC—JC flipflops are discharging. The operation of the open sales key also, via a separate control lead (not shown) gives an indication to the ticket issuing positions that sale can commence. This function can be performed in any well-known manner.

A further function which can be provided is the non-runner operation, whereby the counting equipment is disabled if a ticket issuing machine is set for a bet on a competitor which has become a non-runner. When a competitor becomes a "non-runner," a non-runner key is operated, which connects the appropriate runner lead of L1 to LN to a non-runner flip-flop circuit. This has not been shown, but is similar to the flip-flops shown. This flip-flop in its normal position biasses positive a gate circuit controlling GPC, although GPC is shown as being controlled directly from tube R. Hence the trigger electrode circuit of GPC, with the non-runner flip-flop provided, is controlled from tube R and the normally discharging tube of the non-runner flip-flop. When an attempt is made to register a bet on a non-runner, the non-runner flip-flop changes its condition, disabling GPC before it can allow PC to operate, and re-setting R—S to S discharging, which in addition to its normal functions would then restore the non-runner flip-flop to its normal condition. With this facility provided it might be preferable for PC to reset to its ninth cathode, so that it does not matter if PC does step once. The operation of the non-runner flip-flop would also be used to indicate to the ticket issuing machine that the non-runner key had been operated for that competitor. These additional circuits have not been shown to avoid unduly complicating the diagrams.

It is assumed that the ticket issuing positions also have control equipment of well known type to render them inoperative if an attempt is made to enter bets on competitors in the wrong race. Such race-number switch control equipment may take any well-known form.

When the open sales key has been operated, the pulse supply is switched on and tube D, Fig. 2 is caused to step through its cycle in response to the —$Pa$ pulses. On each step it applies a positive potential to the output lead to one of the ticket issuing machines. Although each of these output leads has been shown as extending directly to a ticket issuing machine, it actually does so via a cathode follower circuit of the same type as the stake cathode followers. These ten cathode followers are omitted to avoid unduly complicating the drawings. The cathode time constants of tube D should preferably have short time constants so that there is no risk of more than one ticket issuing machine attempting to operate.

It will be assumed that ticket machine No. 1 has its keys set for a three unit (i. e. six shillings in Great Britain) bet on runner No. 1. This means that the operator will have opened the A contact, closed the three unit bet key, thereby closing contacts S1 and S2, closed the key for runner No. 1, thereby closing contact R1, and closed contact Z. As has been described, the operations of A and Z can be fully automatic. When the distributor tube D is discharging at its first cathode D1, the cathode follower controlled thereby (not shown) applies a positive potential to the lead 3 from that cathode. This positive potential is applied via contact Z closed, rectifier W1 and the Z lead to the control grid of the cathode follower ZF. This tube therefore delivers an output which biasses rectifier W30 positive. Tube EC of the EC—JC flip-flop individual to ticket issuing machine No. 1 is still discharging, despite the opening of A, so rectifier W31 is also biassed positive. Thereupon a positive going pulse is applied via a condenser to the trigger electrode of tube R, which therefore fires and extinguishes tube S in the manner already described.

It will be noted that the EC control in this gate is shown as a single rectifier W31. This rectifier is actually biassed positive by the output of a cathode follower which is only conducting if all tubes EC are discharging. This is the correct condition when the distributor is stepping. This cathode follower is preferably of the same type as the stake cathode followers.

When S is extinguished, its cathode output potential disappears, so the distributor is stopped with the discharge therein at its first cathode.

Since it has been assumed that the bet to be registered is a three-unit bet, contacts S1 and S2 are closed. Therefore tubes SV1 and SV2 both deliver outputs in response to the positive potential applied from the distributor cathode follower.

Turning now to Fig. 3 and Fig. 3A, the output from the cathode of tube R causes the gate tube GPC to be opened, so that —$Pa$ pulses are applied therethrough to tube PC to cause the discharge therein to be stepped. The outputs from SV1 and SV2 bias positive rectifiers W7, W11 and W12, and each positive $Pa$ pulse biasses positive rectifiers W9, W14 and W32. Therefore when the discharge in PC reaches PC3, W13 is biassed positive and the next +$Pa$ pulse causes a pulse to be applied to the grid of VT. Similarly pulses are applied to the grid of VT in response to the discharge in PC reading PC5 and PC7. Thus three pulses are applied to the grid of tube VT, which therefore gives an output of three —$Pb$ pulses. The operation when PC reaches PC9 will be described below.

The positive potential on lead 3 is also applied via the closed runner key contact R1 (Fig. 1), and rectifier W2 to the runner lead L1 for the selected runner. As has been indicated, it is preferable for this potential to cause a cathode follower (not shown) to operate. The positive potential on L1, via a cathode follower if provided therefore biasses positive the rectifiers such as W21, W24 for the counter for runner No. 1 and opens the first gate tube GRU for runner counter No. 1. The —$Pb$ pulse train of three pulses generated as described above is applied to the cathodes of the gate tubes of all runner counters, but is only effective in those for runner No. 1. This counter therefore adds to its total three units. If carry-over is necessary it occurs, as has already been described.

The —$Pb$ pulse train is also applied to the cathodes of the gate tubes of the total counter, Fig. 5. This counter also adds three units to its total.

When the discharge in PC reaches PC9, the positive output potential therefrom is applied to the trigger electrode of S, which thereupon fires and extinguishes R. This closes the gate tube GPC, and opens gate tube GD so that on the next —$Pa$ pulse the distributor recommences its stepping. The PC9 output also biasses positive rectifier W33, and as W34 is biassed positive from D1 and W35 biassed positive from ZF, a positive potential is applied to the trigger electrode of tube JC. JC therefore fires and extinguishes EC, as has been described. The anode current of JC also operates a quick-acting relay CB, which closes its contact $cb1$. This, via lead 2, causes relay SCC at the appropriate ticket issuing machine to operate. The operation of SCC, by well-known means, not shown, causes the printing and issuing of the ticket. Thus it will be seen that a ticket is only issued after the bet has been registered.

When the ticket is issued, contact A is reclosed, re-operating tube EC for ticket issuing machine No. 1, and all other contacts opened. This resetting action is performed in well known manner when printing occurs. The operation of EC extinguishes JC and causes CB to release. This at $cb1$ releases SCC, which leaves all apparatus ready for further betting.

*The provision of a plurality of pools*

In totalisator installations it is often desirable to permit betting in any one of a number of pools, such as the "Win" pool and the "Place" pool. In Great Britain, a bet in the place pool is a selection of a particular runner to come first, second or third. In the United States of America it is selection of a runner to come second or first. As has been described, the provision of a number of pools can be effected by having a system, such as described with reference to Figs. 1 to 5, for each pool.

As an alternative, the method described with reference to Figs. 6 and 7 may be used.

Fig. 6 shows the modifications necessary to Fig. 1 to permit betting in either one of two pools, i. e. win and place. Inserted in series with contact Z and rectifier W1 is a changeover contact P, which can be set to either contact $a$ for a win bet or to contact $b$ for a place bet. This contact is preferably normally set to the mid-position shown. Contacts $a$ and $b$ are respectively connected over commoned Z leads to cathode followers ZWF and ZPF. The tube R (not shown in detail in Fig. 6) is operable in response to conduction in either ZWF or ZPF.

Fig. 7 and Fig. 7A show the modified pulse generation circuit. The controlling tube PC and its gate tube are the same as shown in Fig. 3A, and are therefore not shown in Fig. 7 and Fig. 7A. The gates controlled by PC3, PC5 and PC7 are duplicated, one of each of these pairs of gates having an extra control point which is only biassed positive when ZWF conducts and the other of the pair having an extra control point which is only biassed positive if ZPF conducts. The cathode follower CF4 is controlled as before from PCIV, thus conducting when the tube PC discharges at PC2, PC4, PC6 and PC8, but it controls either one of two gates, one controlled from ZWF and one controlled from ZPF. As before all gates include controls from SV1, SV2 or SV4.

All ZWF controlled gates are connected to the output of tube VWT, and when they deliver output pulses to the grid of VWT, that tube gives an output pulse train of from one to seven pulses —PW. Tube VPT is similarly controlled by all gates controlled by ZPF to deliver output pulse trains —PP when required.

For example, it is assumed that the bet to be recorded is a five unit place bet. In that case S1 and S4 (Fig. 1) are closed, so that when the distributor energises the lead 3 for that ticket issuing machine tubes SV1 and SV4 deliver outputs. Therefore, in Fig. 7 and Fig. 7A, rectifiers W38, W39, W40 and W41 are biassed positive from SV1 and SV4. As the bet to be registered is a place bet, rectifiers W42, W43, W44 and W45 are all biassed positive. None of the rectifiers controlled from ZWF are biassed positive, so tube VWT is disabled.

In the manner already described, PC (see Fig. 3A) is caused to step once through its cycle. When it energises PC2, PC4, PC6, PC8, CF4 conducts, thus conducting four times. Each time it conducts it biasses W46 and W47 positive but the biassing positive of W46 has no effect as ZWF is not conducting. On each +Pa pulse a rectifier in each gate in Fig. 7 and Fig. 7A is biassed positive, and when the +Pa pulse biasses W48 positive at the same time as W41, W42, and W47 are biassed positive, a pulse is applied to the control grid at VPT. Thus a pulse is applied to the control grid of VPT when PC is discharging at PC2 and when it is discharging at PC4.

When PC steps to PC5, rectifiers W49 and W50 are biassed positive. The biassing positive of W50 is ineffectual as ZWF is not conducting. However, the next Pa pulse, which biasses W51 positive also finds W39, W43 and W49 biassed positive, so a positive pulse is applied to the control grid of VPT. When PC steps to PC6, a pulse is applied to VPT via the CF4 controlled gate, and the same occurs at PC8.

Hence stepping of PC to PC2, PC4, PC5, PC6, and PC8 each causes a pulse to be applied to the control grid of VPT; thus five pulses have been applied thereto. On each pulse on its grid, VPT delivers an output negative going pulse —PP, so that an output pulse train of five pulses has been produced.

The counters are the same as those shown in Figs. 4 and 5 except that the win counters are controlled by the —PW pulses generated from tube VWT, and the place counters are controlled by the —PP pulses generated from tube VPT.

*The enlarged distributor (Fig. 8)*

This shows a distributor for use when more than 10 ticket issuing machines are to be catered for. It comprises two tubes DA and DB which are arranged to give eighteen outputs. The normal condition to which the arrangement is reset between races is with tube DA discharging at its first cathode DA0 and DB discharging at its tenth cathode DB10. The discharge at cathode DB10 causes a positive potential to be applied therefrom via rectifier W60 to the trigger electrode of gate tube GDA.

Also connected to the trigger electrode of GDA is a rectifier W61, which is biassed positive from the cathode of tube S. The control circuit of the gate tube GDB for tube DB also includes a rectifier W62 biassed positive from the output of S.

Hence in the normal condition, i. e. tube DA discharging at DA0, tube DB discharging at DB10 and tube S discharging, the gate tube GDA is held open and —Pa pulses are gated therethrough to tube DA, which therefore is stepped through its cycle until the discharge reaches DA9, when a positive potential is applied therefrom via rectifier W63 to the trigger electrode of GDB. On the next Pa pulse, a pulse is passed by GDA to cause DA to step once, returning it to its normal condition with the discharge at DA0, and a pulse is gated via GDB to step the discharge in DB to DB1. This removes the positive bia from DB10 which previously held gate GDA open. The positive output from DA0 is applied via W64 to GDB to supply the operating bias therefor.

Subsequent Pa pulses are only effective on DB until the discharge therein reaches DB9, when positive potential is applied therefrom via W65 to the trigger electrode of GDA. The next Pa pulse therefore steps DB to DB10 and DA to DA1. The discharge having left, there is no bias applied to GDB which cannot pass any pulses until the discharge in DA reaches DA9. The nine outputs from DB are numbered 10 to 18 for ticket issuing machines No. 10 to No. 18.

It will be noted that the rest cathode are not used as distributor outputs because the discharge rests on each rest cathode for half of a cycle. Hence when a number of multi-gap tubes are interconnected as a distributor only 9 outputs per tube can be employed. The principle of this distributor can be applied using larger numbers of multi-gap tubes.

As in the distributor of Fig. 2, the extinguishment of tube S when a "calling" ticket issuing machine is encountered stops the distributor by removing the positive biasses from W61 and W62. The gate tubes and the biassing arrangements for the multi-gap tubes in Fig. 8 are similar to the corresponding arrangements in Fig. 2.

In all cases where multi-cathode tubes are used, counting chains using interconnected three electrode tubes could be used, and similarly other well-known electronic devices, not necessarily using gaseous discharge devices, could be used to replace the elements shown.

While the principles of the invention have been described above in connection with specific embodiments, and particular modifications thereof, it is to be clearly understood that this description is made only by way of example and not as a limitation on the scope of the invention.

What we claim is:

1. A totalisator comprising a central source of electrical pulses, a plurality of ticket issuing machines, aggregating equipment comprising a plurality of aggregators, a distributor separate leads connecting said distributor to said ticket issuing machines, means responsive to pulses from said source for operating said distributor to transmit a different pulse in a cycle of repetitive pulses to each of said ticket issuing machines over said leads and thus to control the order in which said ticket issuing machine can pass signals representing bets to said aggregating equipment, a set of common stake leads to which all of said ticket issuing machines are connected, a set of contact pairs in each ticket issuing machine, one contact of each pair connected respectively to said stake leads, the other contacts of said contact pairs being connected to said distributor over said separate lead for that machine, means for selectively closing one or more of said contact pairs when a ticket issuing machine is ready to send a signal representing a bet for connecting said distributor over the particular lead to a combination of said stake leads which represents a number of units in the stake, said combination including one unit, thereby to energize said combination of stake leads, means comprising a counter connected to said pulse source and responsive to the combination of said stake leads which are energized for causing said counter to count out a selected number of pulses determined by said combination and means for selecting an aggregator to which said pulses are to be transmitted, means controlled by said pairs of contacts which are closed for transmitting said selected number of pulses to said selected aggregator, said distributor comprising pairs of spaced electrodes forming the chain of interconnected discharge gaps, means to cause the discharge to progress from gap to gap under control of said pulses, the electrodes of said gaps being connected to the separate leads to the ticket issuing machines, means responsive to a ticket issuing machine having a bet to send when the connection thereto to said distributor is energised to stop said distributor, and means for starting said distributor after a selected number of pulses have been applied to the selected aggregators.

2. A totalisator, as claimed in claim 1, and in which said distributor comprises a gating device and a single cold cathode multi-cathode gaseous discharge tube in which the discharge steps from cathode to cathode under control of pulses applied thereto via said gating device, each said output connection being the output from a cathode of said tube.

3. A totalisator comprising a central source of electrical pulses, a plurality of ticket issuing machines, aggregating equipment comprising a plurality of aggregators, a distributor, separate leads connecting said distributor to said ticket issuing machines, means responsive to pulses from said source for operating said distributor to transmit a different pulse in a cycle of repetitive pulses to each of said ticket issuing machines over said leads, a set of common stake leads to which all of said ticket issuing machines are connected, a set of contact pairs in each ticket issuing machine, one contact of each pair connected respectively to said stake leads, the other contacts of said contact pairs being connected to said distributor over said separate lead for that machine, means for selectively closing one or more of said contact pairs when a ticket issuing machine is ready to send a signal representing a bet for connecting said distributor over the particular lead to a combination of said stake leads which represents a number of units in the stake, said combination including one unit, thereby to energize said combination of stake leads, means comprising a counter connected to said pulse source and responsive to the combination of said stake leads which are energized for causing said counter to count out a selected number of pulses determined by said combination, additional selecting means at each of said ticket issuing machines for selecting an aggregator to which said pulses are to be transmitted, and means for transmitting said selected number of pulses to said selected aggregator.

4. A totalisator, as claimed in claim 3, and in which the counter comprises pairs of spaced electrodes forming a chain of interconnected discharge gaps, output connections from a plurality of the electrodes forming said gaps and means for causing the discharge in said chain to pass along said chain from gap to gap and to energize said outputs sequentially, the means for causing said counter to count a selected number of pulses comprising gating means under control of the combination of stake leads which are energized for causing certain of said outputs to cause a pulse to be generated under control of the pulse source.

5. A totalisator, as claimed in claim 4, and in which the gating means comprises a plurality of gate circuits each of which is adapted to deliver an output pulse or pulses under control of the electrodes forming the chain of interconnected discharge gaps when a particular one of the stake leads has been energized.

6. A totalisator, as claimed in claim 5, further comprising means for restarting the distributor when the discharge in the chain of discharge gaps of the counter reaches the electrodes forming a predetermined gap, means also responsive to the discharge in said counter reaching the electrodes of said predetermined gap for sending a check-back signal to the ticket issuing machine, and means responsive to said signal for causing a ticket to be issued by said machine.

7. A totalisator, as claimed in claim 6, and wherein each aggregator comprises pairs of spaced electrodes forming a plurality of sets of interconnected gaseous discharge gaps, there being one such set per decimal denomination, and a carry-over circuit interconnecting electrodes of consecutive sets of gaps.

8. A totalisator, as claimed in claim 7, wherein certain of said aggregators are runner aggregators and the additional selecting means is adapted to apply all pulses selected thereby to all runner aggregators, and separate runner leads connecting said additional selecting means respectively with said runner aggregators, and said totalisator further comprising a gated input circuit for each set of discharge gaps of a runner aggregator so arranged that pulses can be only applied to the electrodes of said gaps if the appropriate runner lead has been energized.

9. A totalisator, as claimed in claim 8, further comprising a set of common pool leads, a plurality of pool contacts at some, at least, of the ticket issuing machines, each of which contacts, when closed, connects said distributor to a corresponding one of said set of common pool leads, a set of runner aggregators and a total aggregator per pool, and means for causing the selected pulses to be applied only to the aggregators corresponding to the pool in which a bet is to be registered.

10. A totalisator which comprises a plurality of common runner leads, a plurality of ticket issuing machines each having an operating lead and a number of runner contacts each of which can connect said operating lead to one of a corresponding number of said common runner leads, and central station equipment which comprises a central source of electrical pulses, an electronic distributor controlled by said pulse source and having a separate output connection extending to each said operating lead, said distributor being arranged to energise said output connections successively, a control contact at each ticket issuing machine; a control lead connected in common to all said ticket issuing machines and which is connected at a ticket issuing machine to said operating lead by said control contact when that ticket issuing machine has a signal representing a bet to send to said central station equipment, an electronic flip-flop circuit of the either-side stable type adapted to be operated to its second condition when said common lead is energised via the control contact and operating lead for a ticket issuing machine with a signal representing a bet to send, means responsive to operation of said flip-flop to its second condition to stop said distributor, with the operating lead for the ticket issuing machine causing said stoppage energised an electric selecting device adapted to be operated by said flip-flop circuit reaching its second condition to select from said pulse source a predetermined number of pulses corresponding to the number of units of the bet, an electronic aggregator per runner lead, an electronic total aggregator, means for applying said selected pulses to the runner aggregator corresponding to the energised runner lead and the total aggregator, means for restarting said distributor after said pulses have been selected by said electronic selecting devices, and means responsive to completion of said pulse selection to send a check back signal to the appropriate ticket issuing machine to cause a ticket to be issued.

References Cited in the file of this patent

UNITED STATES PATENTS 2,472,542     Moerman _____ June 7, 1949

(Other references on following page)

UNITED STATES PATENTS

| | | |
|---|---|---|
| 2,479,681 | Handley | Aug. 23, 1949 |
| 2,523,516 | Potter | Sept. 26, 1950 |
| 2,528,394 | Sharpless | Oct. 31, 1950 |
| 2,557,384 | Klein | June 19, 1951 |
| 2,558,218 | Julius | June 26, 1951 |
| 2,563,041 | Johnston | Aug. 7, 1951 |
| 2,592,312 | Milburn | Apr. 8, 1952 |
| 2,605,967 | Stone | Aug. 5, 1952 |
| 2,622,802 | Handley | Dec. 23, 1952 |
| 2,668,009 | Schmidt | Feb. 2, 1954 |
| 2,680,561 | Handley | June 8, 1954 |
| 2,694,523 | Handley | Nov. 16, 1954 |